Patented Jan. 26, 1954

2,667,440

UNITED STATES PATENT OFFICE 2,667,440

STABILIZED AQUEOUS SOLUTIONS OF PARA-AMINOSALICYLIC ACID SALTS

Roger G. Douris, Paris, and Jacques M. Bory, Montmorency, France

No Drawing. Application December 8, 1950, Serial No. 199,926

Claims priority, application France March 25, 1950

2 Claims. (Cl. 167—58)

The salts of paraaminosalicylic acid in aqueous solution are known to be very susceptible to oxidation. As an example, when it is attempted to sterilize an aqueous solution of sodium salt of paraaminosalicylic acid as is employed for therapeutic purposes, the initially clear, colourless solution assumes a brown hue and becomes toxic.

It is an object of our invention to provide a process for stabilising aqueous solutions of alkaline and alkali-earth metal salts of paraaminosalicylic acid, more particularly aqueous solutions of the sodium salt, whereby the solutions can safely be sterilized and kept without noticeable alteration.

Another object is to provide new aqueous solutions of alkaline and alkali-earth metal salts of paraaminosalicylic acid, more particularly aqueous solutions of the sodium salt, which are stable and capable of being sterilized or tyndallized without noticeable alteration and can be reliably employed for intravenous injection for therapeutic purposes without toxic effects.

We have found that a certain reducing substance when added to aqueous solutions of alkaline and alkali-earth metal salts of paraaminosalicylic acid is capable of stabilizing the same and preventing such alterations as colouration and toxic effects which are ascribable not only to oxidation but also presumably to other chemical reactions such as condensations.

This reducing substance is sodium formaldehyde-sulfoxylate which is desirable because it can be employed in proportions which in addition to being effective are not objectionable for therapeutic administration.

The aqueous solutions to be stabilized may contain from 0.5 to 20 per cent by weight of paraaminosalicylic acid salts.

As to the proportion of the reducing substance this may vary over a wide range there being in principle no upper limit for such proportion, but for practical purposes a proportion of about 0.01 to 1 per cent reckoned on the weight of the aqueous solution to be stabilized is generally satisfactory.

It is preferable to add the reducing substance to water and then to dissolve the required amount of paraaminosalicylic acid salt into the solution thus produced to produce a stabilized solution according to this invention.

With a view to reducing decarboxylation of the paraaminosalicylic acid salt, we have also found that it may be desirable to incorporate sodium bicarbonate in a small proportion, say 0.1 to 0.6 per cent by weight according to the content of paraaminosalicylic acid salt in the aqueous solution stabilized according to our invention, at any stage of or after the production of said solution, but before the sterilization thereof.

*Example.*—One gram of sodium formaldehyde-sulfoxylate was dissolved in a litre of water and then 30 grams of sodium salt of paraaminosalicylic acid were added thereto.

The solution thus produced was put in ampullae which were sterilized for half an hour at temperatures from 100 to 120° C. The solution kept very well, remained clear and colourless, and tests showed it was not toxic.

The same results were observed with a like solution subjected to tyndallization.

It was found that the amounts of sodium formaldehyde-sulfoxylate required for stabilizing aqueous solutions containing from 5 to 200 grams of sodium salt of paraaminosalicylic acid ranged from 0.1 to 20 grams.

Aqueous solutions of calcium salt of paraaminosalicylic acid could likewise be stabilized.

In every case it was found that decarboxylation of the paraaminosalicylic acid salt is lessened when sodium bicarbonate has been incorporated in the solution.

What we claim is:

1. A heat sterilizable aqueous solution for intravenous injection, which contains 0.5 to 20 per cent by weight of sodium salt of paraaminosalicylic acid together with 0.01 to 1 per cent by weight of sodium formaldehyde-sulfoxylate.

2. The composition of claim 1, further containing 0.1 to 0.6 per cent by weight of added sodium bicarbonate.

ROGER G. DOURIS.
JACQUES M. BORY.

References Cited in the file of this patent

UNITED STATES PATENTS

| Number | Name | Date |
|---|---|---|
| 2,540,785 | Hultquist | Feb. 6, 1951 |

OTHER REFERENCES

The Lancet, volume 254, January 31, 1948, page 191.

Oberweger: The Pharm. Journal, page 36, September 9, 1949.

Hicks: American Journal Ophthalmology, 1937, pages 1040 to 1041.